(12) United States Patent
Mariusse et al.

(10) Patent No.: US 10,865,042 B2
(45) Date of Patent: Dec. 15, 2020

(54) DEVICE FOR GRIPPING LOADS OF VARIABLE SIZES, AND CORRESPONDING METHOD FOR ADAPTING GRIPPING WIDTH

(71) Applicant: SAVOYE, Dijon (FR)

(72) Inventors: Adrien Mariusse, Ouroux sur Saone (FR); Erwan Godot, Beaune (FR)

(73) Assignee: SAVOYE, Dijon (FR)

( * ) Notice: Subject to any disclaimer, the term of this patent is extended or adjusted under 35 U.S.C. 154(b) by 128 days.

(21) Appl. No.: 16/334,990

(22) PCT Filed: Sep. 20, 2017

(86) PCT No.: PCT/EP2017/073791
§ 371 (c)(1),
(2) Date: Mar. 20, 2019

(87) PCT Pub. No.: WO2018/060031
PCT Pub. Date: Apr. 5, 2018

(65) Prior Publication Data
US 2019/0283966 A1 Sep. 19, 2019

(30) Foreign Application Priority Data
Sep. 27, 2016 (FR) ..................... 16 59139

(51) Int. Cl.
*B65G 1/137* (2006.01)
*B65G 1/04* (2006.01)

(52) U.S. Cl.
CPC ......... *B65G 1/1375* (2013.01); *B65G 1/0492* (2013.01); *B65G 2207/08* (2013.01)

(58) Field of Classification Search
CPC combination set(s) only.
See application file for complete search history.

(56) References Cited

U.S. PATENT DOCUMENTS 4,005,786 A * 2/1977 Adelson ............... B65G 1/0464
414/281
6,182,819 B1 2/2001 Rehm
(Continued)

FOREIGN PATENT DOCUMENTS

CN 103153822 A 6/2013
EP 0733563 A1 9/1996
(Continued)

OTHER PUBLICATIONS

International Search Report and Written Opinion dated Dec. 1, 2017 for corresponding International Application No. PCT/EP2017/073791, filed Sep. 20, 2017.
(Continued)

*Primary Examiner* — Kyle O Logan
(74) *Attorney, Agent, or Firm* — David D. Brush; Westman, Champlin & Koehler, P.A.

(57) ABSTRACT

A device for gripping a load including first and second frame portions, a translation for moving the frame, first and second gripping arms mounted on the first and second frame portions, respectively, so as to move a load, and a width-adjustment for adapting a width of the first and second gripping arms. The width adjustment includes first locking/unlocking elements that lock the first frame portion relative to the path of travel, second locking/unlocking elements that unlock the second frame portion relative to the first frame portion, and a translation that moves the second frame portion along the path of travel.

8 Claims, 5 Drawing Sheets

(56) References Cited

U.S. PATENT DOCUMENTS

| | | | |
|---|---|---|---|
| 9,522,781 | B2 | 12/2016 | Hortig et al. |
| 9,944,464 | B2 * | 4/2018 | Ueda .................... B65G 1/1373 |
| 2010/0232916 | A1 | 9/2010 | Tullio et al. |
| 2015/0081089 | A1 * | 3/2015 | Kapust ................. B65G 1/0435 |
| | | | 700/218 |
| 2017/0313512 | A1 * | 11/2017 | Miyagawa ........... B65G 47/905 |
| 2018/0022547 | A1 * | 1/2018 | Wehner ................. B65G 1/065 |
| | | | 414/279 |

FOREIGN PATENT DOCUMENTS

| | | |
|---|---|---|
| EP | 0970773 A2 | 1/2000 |
| EP | 2526032 A1 | 11/2012 |
| JP | H10139110 A | 5/1998 |
| JP | 3454339 B2 | 10/2003 |
| WO | 2012044734 A1 | 4/2012 |
| WO | 2015069105 A1 | 5/2015 |

OTHER PUBLICATIONS

International Preliminary Report on Patentability and English translation of the Written Opinion dated Apr. 2, 2019 for corresponding International Application No. PCT/EP2017/073791, filed Sep. 20, 2017.

Chinese Search Report dated Apr. 25, 2020 for Chinese Application No. 201780055716.3.

Chinese Office Action and English translation dated Apr. 29, 2020 for Chinese Application No. 201780055716.3.

* cited by examiner

DEVICE FOR GRIPPING LOADS OF VARIABLE SIZES, AND CORRESPONDING METHOD FOR ADAPTING GRIPPING WIDTH

CROSS-REFERENCE TO RELATED APPLICATIONS

This Application is a Section 371 National Stage Application of International Application No. PCT/EP2017/073791, filed Sep. 20, 2017, which is incorporated by reference in its entirety and published as WO 2018/060031 A1 on Apr. 5, 2018, not in English.

1. FIELD OF THE INVENTION

The present invention relates to the field of the handling of loads.

The present invention relates more particularly to a load-gripping device (also called a "gripper") designed to enable the handling of loads of variable sizes. Such a device can be implemented for example on a motor-driven shuttle (also called a collecting and transportation trolley) or a stacker crane for storage and/or logistics preparation warehouse. A shuttle or a stacker crane is an independent handling apparatus designed to move in a storage area in order to place loads therein or remove loads therefrom.

The invention has numerous applications, particularly in the field of logistics, for example the automated storage and/or preparation of packages.

2. TECHNOLOGICAL BACKGROUND

Transportation shuttles are conventionally implemented in an automated package-preparing system in order to efficiently and automatically convey loads from a storage depot up to a conveyor or a package-picking or package-preparing station.

A storage depot generally comprises several superimposed stacking levels in which the shuttles move the loads in order to place them inside storage locations and in order to pick them out of these locations. These shuttles can not only move horizontally at a given level but can also be conveyed from one level to another by elevators. Conventionally, a storage depot comprises several storage alleys or lanes each serving, on either side, a storage shelf (or shelving unit) with several levels of superimposed stacking units in which the shuttles move the loads independently. At each rack level, tracks or paths are provided for the horizontal movement of the shuttles. An elevator is disposed at one extremity of the alley. A track is generally formed by two parallel rails and the shuttle is equipped with motor-driven wheels to move on these rails.

An example of such a shuttle is described in the patent document EP 2526032. This shuttle has a chassis with two portions and a load-supporting surface between the two chassis portions, each chassis portion being provided with wheels. The wheels are driven rotationally by a translation motor to ensure the moving of the shuttle on a runway. The shuttle comprises a first gripping arm and a second gripping arm, respectively mounted on the first and second chassis portion and configured to move a load from or to the load support area. The shuttle is furthermore equipped with width-adjusting means, such means being configured to adapt the width between the first and the second gripping arms in order to enable the gripping of loads of different widths. This known solution proposes, as width-adjusting means, a connecting assembly that connects the two chassis portions and is used to vary the space between these two chassis portions and therefore in the width between the two gripping arms. In a first embodiment, the connecting assembly comprises a dedicated motor that actuates a pinion gear engaged with a rack bar. In a second embodiment, the connecting unit comprises a dedicated motor that actuates an assembly comprising a pulley and a belt. However, such adjustment means necessitate the use of a complicated mechanical system and a dedicated drive system to adjust the width between the gripping arms as a function of the size of the load. This solution is therefore not optimal in terms of costs as well as space requirement and weight.

3. GOALS OF THE INVENTION

The invention, in at least one embodiment, is aimed especially at overcoming these drawbacks of the prior art.

More specifically, it is a goal in at least one embodiment of the invention to propose a load-gripping device that is simple to implement, economical and has reduced space requirement and reduced weight.

4. SUMMARY OF THE INVENTION

In one particular embodiment of the invention, a device is proposed for gripping a load, comprising:
  a chassis comprising first and second chassis portions defining a load support area;
  means of translation configured to actuate means for moving the chassis along a path of travel;
  first and second gripping arms mounted respectively on the first and second chassis portion and configured to move a load from or to said support area; and
  means for adjusting the width, configured to adapt a width between the first and second gripping arms;
the translation means being comprised in the second chassis portion and said width adjusting means comprising:
  first means for locking/unlocking the first chassis portion relative to the path of travel;
  second locking/unlocking means for locking/unlocking the second chassis portion relative to the first chassis portion; and
  said translation means,
so that, for an adapting of width between the first and second gripping arms, the first locking/unlocking means lock the first chassis portion relative to the path of travel, the second locking/unlocking means unlock the second chassis portion relative to the first chassis portion and said translation means actuate the movement means to move the second chassis portion along the path of travel.

Thus, the invention relies on a wholly novel and inventive approach to the adjusting of gripping width. Indeed, the principle consists of a novel way to use the translation means of the gripping device to combine them with novel locking/unlocking means so as to carry out an adjustment of the width between the first and second gripping arms. The translation means according to the invention thus fulfill two functions: the classic translation function that enables the device to move on the path through the movement means, and a secondary function of adjusting the gripping width when these translation means are combined with the means for locking/unlocking the first and second chassis portions. The interactions between the different means of the invention produce a genuine effect of synergy since the translation means used to carry out the classic function of translation of the chassis are re-utilized here to carry out another function (adjustment of width) since they are combined with the locking/unlocking means. The width-adjusting means according to the present invention are relatively simple and cost little to implement. They are also compact and light as compared with the known solutions of the prior art.

According to one particular aspect of the invention, the width-adjusting means (i.e. the first locking/unlocking means as well as said translation means) are driven by a control unit comprised in the gripping device.

According to one particular characteristic, the first locking/unlocking means are comprised in the first chassis portion and comprise at least one first electromagnetic or electromechanical element cooperating with the path.

This type of element is simple and costs little to implement, while being compact.

According to one particular characteristic, the second locking/unlocking means comprise at least one second electromagnetic or electromechanical element cooperating with a linking means mechanically attached to one amongst the first and second chassis portions.

If the second electromagnetic unit cooperates with the second chassis portion, then the linking means are fixed to the first chassis portion. Conversely, if the second electromagnetic element cooperates with the first chassis portion, then the linking means are fixed to the second chassis portion. These elements are furthermore simple and cost little to implement while being compact.

According to one particular advantageous aspect of the invention, the first and second chassis portions comprise guidance means allowing the first chassis portion to be guided slidingly relative to the second chassis portion.

Thus, through these guidance means, when said translation means actuate the movement means in combination with the locking/unlocking means, the movement in translation of the second chassis portion relative to the first chassis portion is thereby facilitated.

According to one particular characteristic, said first and second chassis portions are provided respectively with a first pair and a second pair of wheels adapted to moving on the path, the translation means being configured to actuate the wheels of said second pair only.

Thus, only the wheels situated on the second chassis portion are motor-driven, enabling simple control of the width-adjusting means.

In another embodiment of the invention, a method is proposed for adapting a width between first and second gripping arms of the gripping device mentioned here above (in any one of its different embodiments) comprising a chassis comprising first and second chassis portions defining a load-supporting area, translation means configured to actuate means for moving the chassis along a path of travel, first and second gripping arms mounted respectively on the first and second chassis portions and configured to move a load from or to said support area, the method comprising the following steps:

locking the first chassis portion relative to the path;
unlocking the second chassis portion relative to the first chassis portion;
adapting the width between the first and second gripping arms to move the second chassis portion in translation along the path.

Thus, by simple locking action to maintain the first chassis portion in position and unlocking action to make the second chassis portion mobile in translation, the invention proposes a simple solution to adapt the gripping width to the dimensions of the load to be moved. The adapting of width is done by actuating the translation means to actuate the movement means so as to move the second chassis portion in translation along the path and to adapt the width between the first and second gripping arms. Once the adapting of width is done, the first chassis portion is unlocked relative to the path, the second chassis portion is unlocked relative to the first chassis portion and the gripping arms are actuated to move the load from or to said support area with the adapted width.

According to one particular characteristic, the method comprises a preliminary step for moving the chassis to position the first chassis portion as a function of a location of a first side of a load (corresponding to a first lateral face of the load for example), the first chassis portion being unlocked relative to the path and the second chassis portion being locked relative to the first chassis portion, said adapting step being carried out as a function of a location of a second side of the load (corresponding to a second lateral face of the load for example).

Another embodiment of the invention proposes a computer program product comprising program code instructions for implementing the above-mentioned method (in any of its different embodiments) when said program is executed on a computer.

Another embodiment of the invention proposes a computer-readable and non-transient storage medium storing a computer program comprising a set of instructions executable by a computer to implement the above-mentioned method (in any one of its different embodiments).

5. LIST OF FIGURES

Other features and advantages of the invention shall appear from the following description given by way of an indicative and non-exhaustive example and from the appended drawings, of which:

Figure 7:
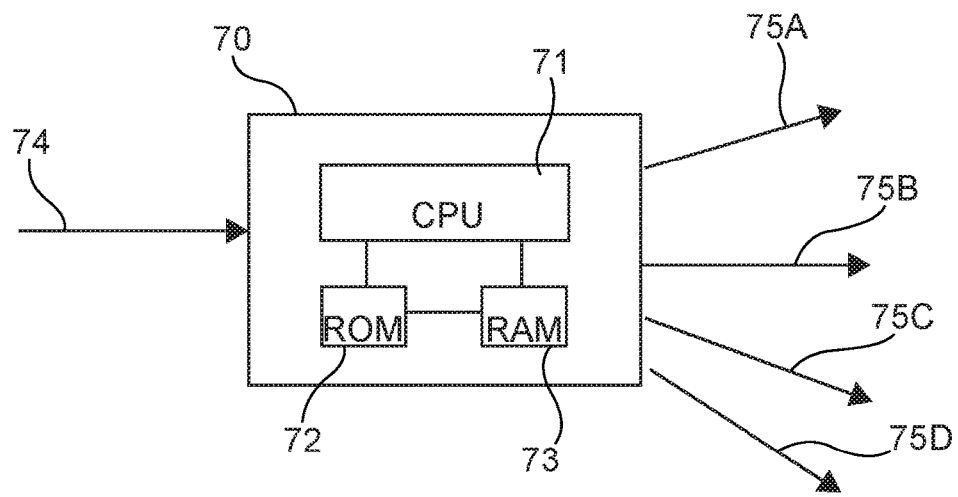
Figure 6A:
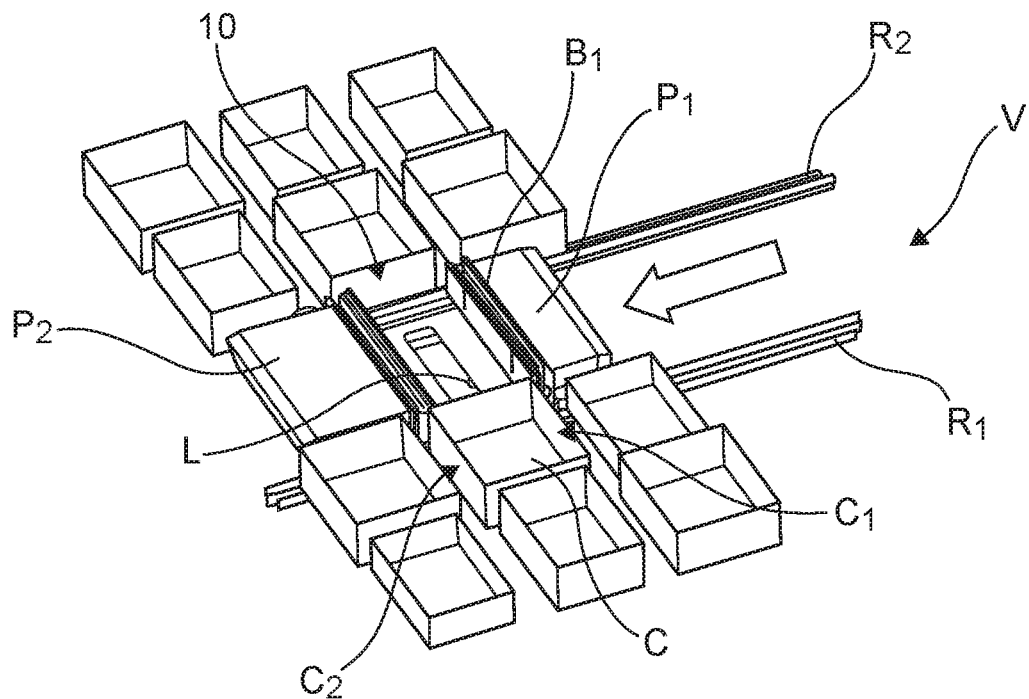
FIGS. 6A to 6D represent schematic views illustrating the main steps of the method described in FIG. 5.
Figure 6B:
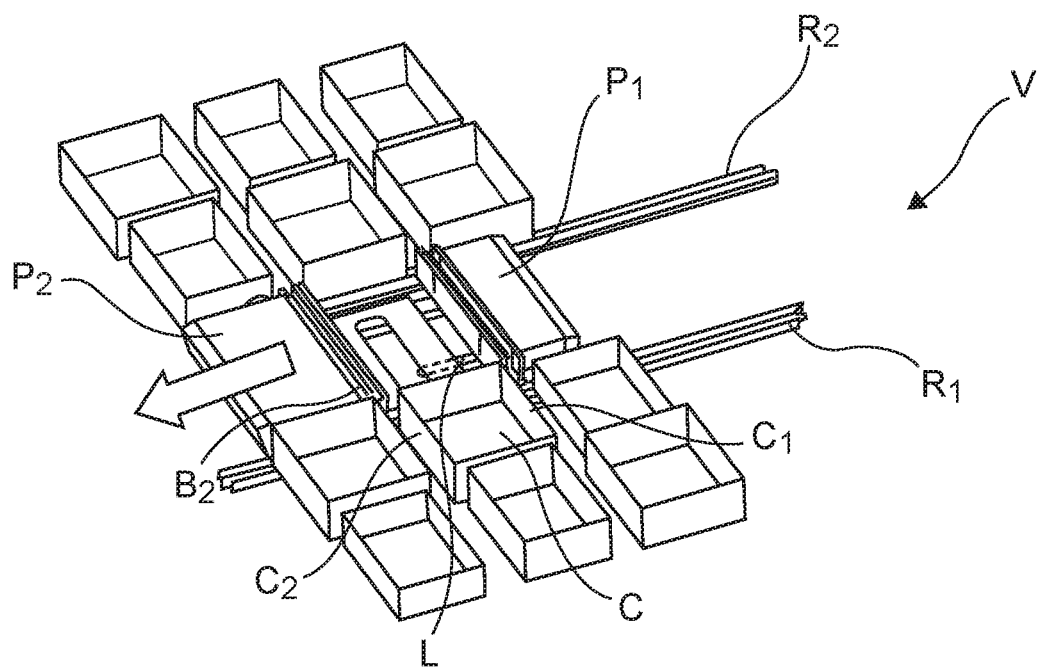
Figure 6C:
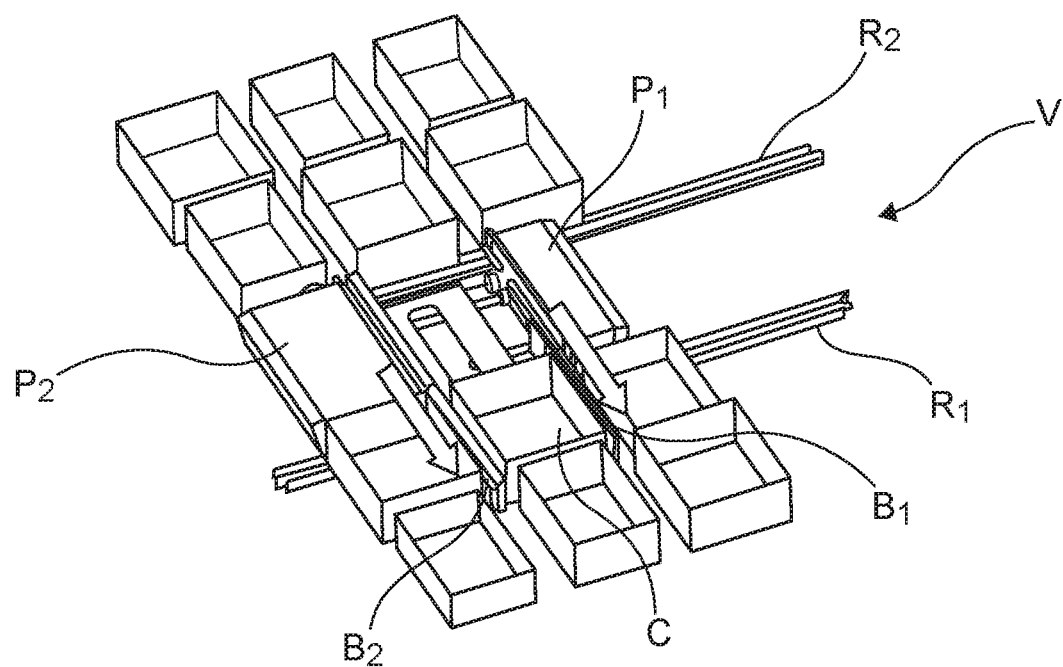
Figure 6D:
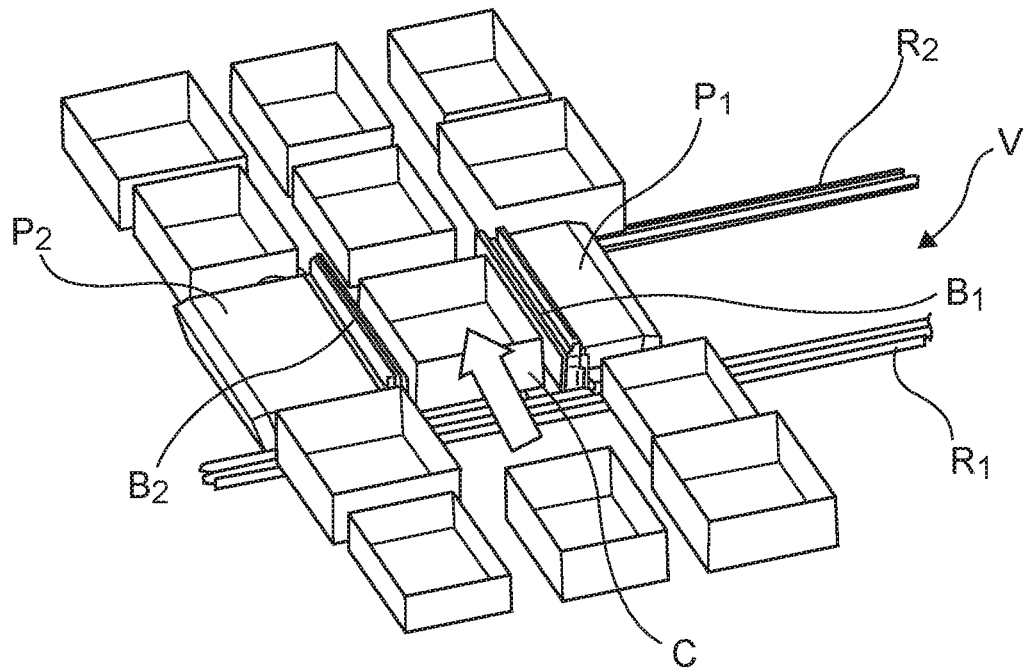

FIG. 7 presents the structure of a control unit according to one particular embodiment of the invention.

6. DETAILED DESCRIPTION

In all the figures of the present document, the identical elements and steps are designated by one and the same numerical reference.

Referring to FIGS. 1 to 4, we present the structure of a gripping device according to one particular embodiment of the invention. In this particular embodiment, the gripping device is implemented on a transportation shuttle 10. For example, it may be a shuttle circulating in a storage depot of an automated package-preparing system.

The gripping device described here comprises a chassis constituted by first and second chassis portions P1 and P2 defining a load support area S.

The gripping device comprises a first gripping arm and a second gripping arm B1 and B2, mounted respectively on the first and the second chassis portions P1 and P2. The two gripping arms B1 and B2 are configured to move a load from or to the supporting area S. The two gripping arms B1 and B2 can grip a load from a given storage location and transfer it to the support area S or grip the load situated on the support area S and transfer it to a given storage location of the storage depot. Each gripping arm is motor-driven and is based for example on a telescopic operating system. Other types of gripping arms fulfilling the same function can of course be envisaged without departing from the framework of the invention.

The first and second chassis portions P1 and P2 respectively comprise a first pair and a second pair of wheels (movement means referenced MD1 and MD2 in the figures) adapted to moving on the path of travel V. The path of travel in this example is horizontal and is constituted by two parallel rails R1 and R2.

The movement means of the chassis illustrated here comprise wheels MD1, MD2. It is clear that other types of movement means can be envisaged without departing from the framework of the invention, for example magnetic levitation modules for magnetic guiding of the chassis on the path of travel for example.

The second chassis portion comprises a translation motor M configured to actuate the wheels MD2 of the second pair only (in other words, only the wheels MD2 are motor-driven) so as to move the chassis on the path of travel V. The translation motor M cooperates with an absolute motion encoder CO to position the chassis on the path of travel as a function of the location of storage of the load in the storage depot. The translation motor M and the encoder CO form the translation means of the device according to the invention.

The gripping device according to the invention furthermore comprises width-adjustment means configured to adapt the width between the first and second gripping arms (here below denoted as a "gripping width" or "load-holding width"). These width-adjustment means comprise:
  first locking/unlocking means MV1, configured to take two states: a locked state and an unlocked state respectively preventing and allowing the movement of the first chassis portion P1 relative to the path of travel;
  second locking/unlocking means MV2 configured to take two states: a locked state and an unlocked state respectively preventing and allowing the moving of the second chassis portion P2 relative to the first chassis portion P1;
  the translation means M and CO described here above.

Figure 1:
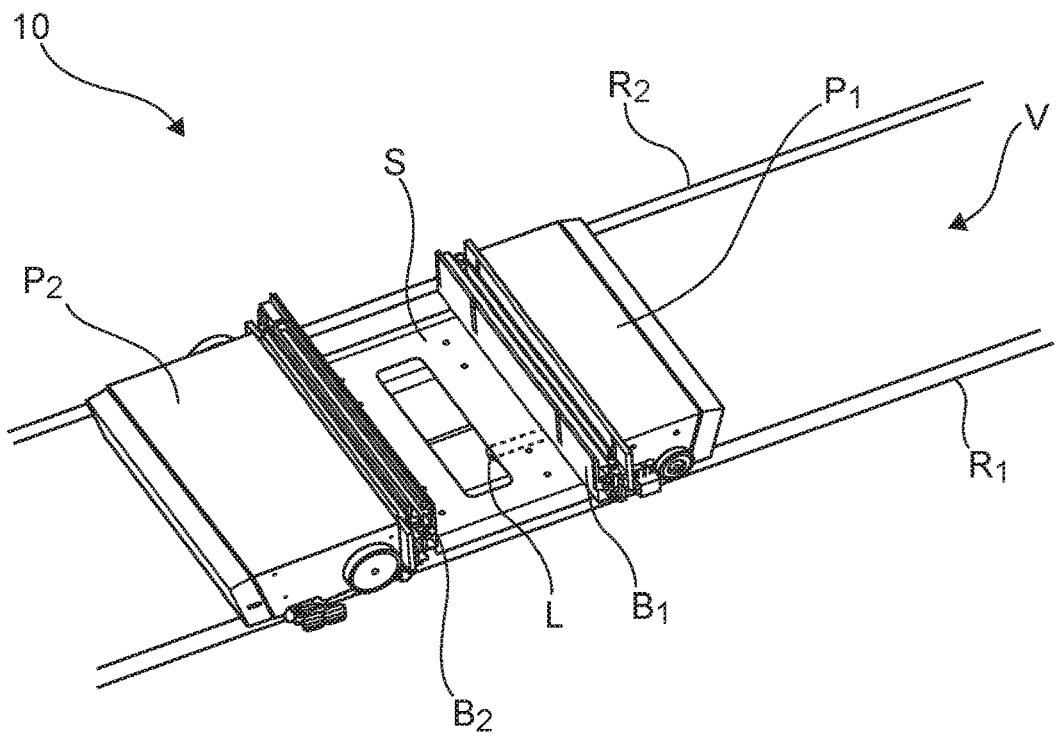
FIGS. 1 to 4 represent different views in perspective or three-quarter views of a gripping device according to one particular embodiment of the invention implemented on a transportation shuttle.
Figure 2:
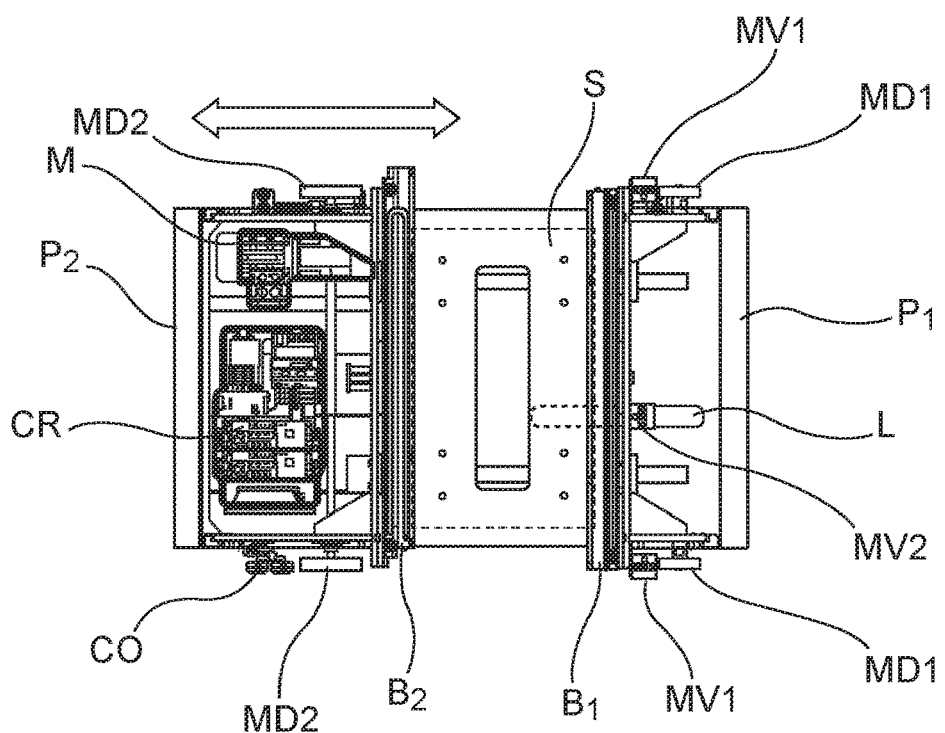
Figure 3:
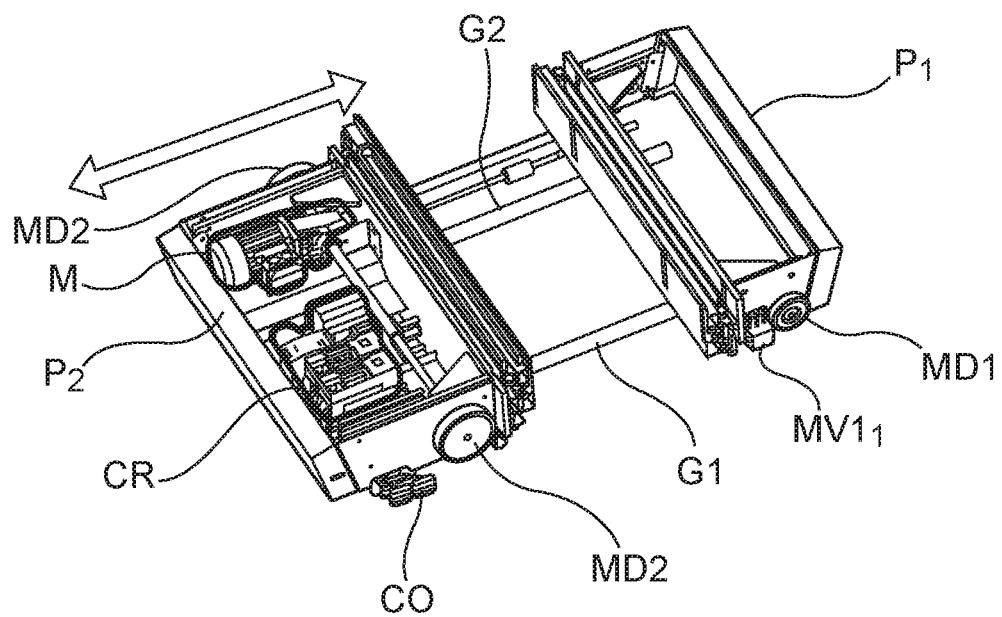
Figure 4:
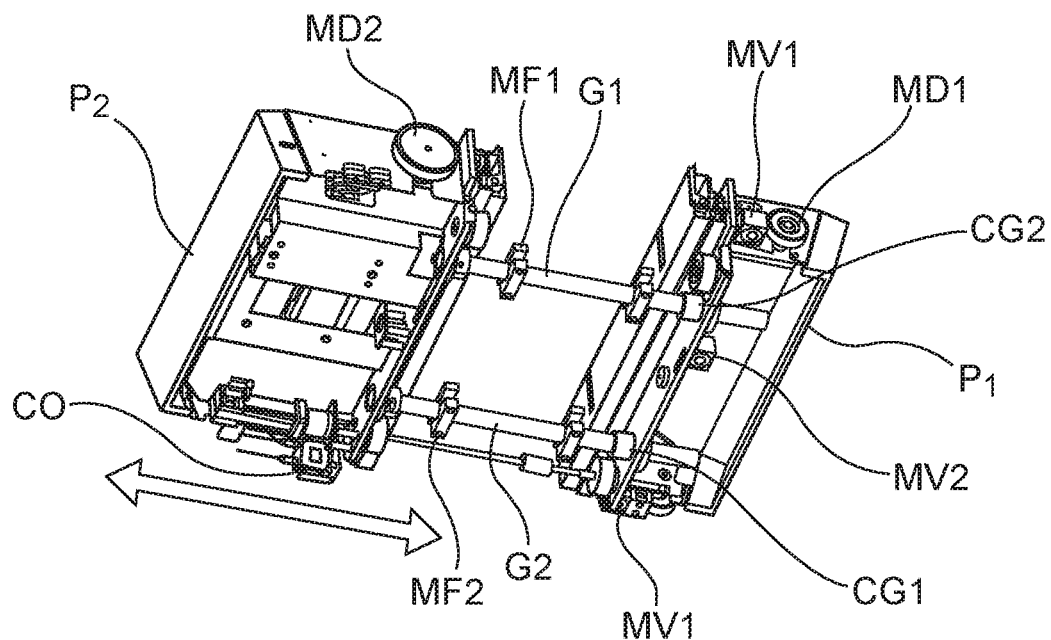
Figure 5:
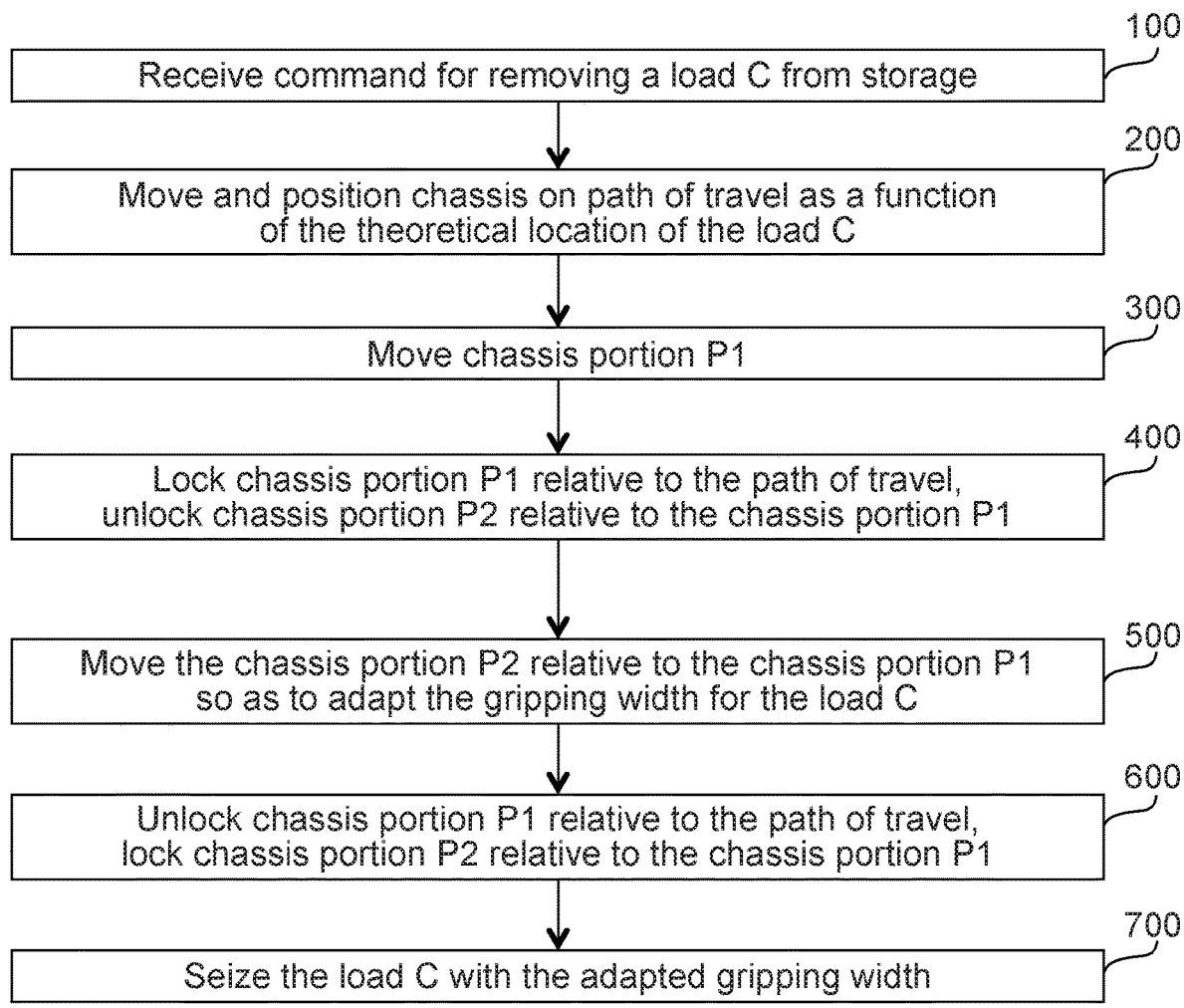
FIG. 5 is a flowchart of one particular embodiment of the method of adapting according to the invention.

In general, the principle is that, in order to adapt the width between the first and second gripping arms to a given load:
  the first locking/unlocking means MV1 are placed in the locked state (to lock the first chassis portion P1 relative to the path of travel) so that the first chassis portion P1 is kept in position,
  the second locking/unlocking means MV2 are placed in the unlocked state (to unlock the second chassis portion P2 relative to the first chassis portion P1) so that the second chassis portion P2 is kept mobile in translation, and
  the translation mean M and CO actuate the wheels MD2 of the second pair to move the second chassis portion P2 along the path (this movement is symbolized by a double arrow on FIGS. 2, 3 and 4).

Thus, instead of using a dedicated motor and a complicated mechanical system to adapt the gripping width to the load, the adjustment means according to the invention ingeniously re-utilize the translation means of the gripping device and combine them with novel locking/unlocking means to carry out the width-adapting function. The adjustment means according to the invention are therefore simpler and less costly to implement. They have in addition the advantage of reducing the overall space requirement and weight of the device.

According to one particular implementation, the first locking/unlocking means MV1 comprise a pair of electromagnetic suction pads. Each electromagnetic suction pad is mounted on a distinct lateral face of the first chassis portion P1 and comprises at least one permanent magnet in such a way as to interact electromagnetically with one of the metallic rails of the path of travel. In order to carry out a locking/unlocking of the first chassis portion P1 relative to the movement path V. This is an illustratory example and other types of locking/unlocking units fulfilling the same function can be envisaged, such as for example electromechanical locking/unlocking devices. Besides, the number of locking/unlocking devices is not limited to two. It is possible to envisage a larger number of locking/unlocking devices or else to plan for only one such device without departing from the framework of the invention, so long as the number, the nature and the configuration chosen enable the locking/unlocking of the first chassis portion P1 relative to the path of travel V.

According to one particular implementation, the second locking/unlocking means MV2 comprise an electromagnetic suction pad MV2 mounted on the lower face of the second chassis portion P2. The electromagnetic suction pad MV2 comprises for example one or more permanent magnets cooperating electromagnetically with a metal link 1 which is mechanically fixed to the second chassis portion P2. As illustrated in FIGS. 1, 2, 5A and 5B, the linking element L is mechanically fixed to the second chassis portion P2 by means of the load support (S) contained between the two chassis portions of the device. The load support (S) comprises a free extremity on the first chassis portion P1 side and a non-free extremity fixed to the second chassis portion P2. It is possible of course to envisage fixing the linking element L directly to the second chassis portion P2 without making use of the load support area S. Similarly, by way of an alternative, instead of mounting the electromagnetic suction pad MV2 on the first chassis portion P1, an inverse configuration could consist in mounting the electromagnetic suction pad in the second chassis portion P2 and fixedly attaching the linking element to the first chassis portion P1. The material of the linking element L should be chosen so as to be rigid enough to make the two chassis portions P1 and P2 fixedly attached and so as to interact magnetically with the electromagnetic suction pad MV2. As in the case of the first locking/unlocking means, the example described here for the second locking/unlocking means is purely illustratory and other locking/unlocking elements fulfilling the same function can be envisaged, such as for example electromechanical locking/unlocking units. The number of locking/unlocking units is not limited to one and can be greater depending on the magnetic attraction force desired to make the two chassis portions P1 and P2 fixedly attached.

According to one particular embodiment, the device comprises guidance means allowing the two chassis portions to be guided slidingly relative to each other. The guidance means illustrated in FIGS. 3 and 4 are formed by first and second cylindrical rods G1 and G2 cooperating with first and second guidance channels CG1 and CG2 situated on the interior face of the first chassis portion P2. The first and second rods G1 and G2 each have a first non-free extremity fixedly attached to the second chassis portion P2 and a second non-fixed free extremity comprised in the second chassis portion P2. The first and second guidance channels CG1 and CG2 are arranged to enable an axial sliding guidance of the first and second cylindrical rods G1 and G2 respectively, parallel to the axis of movement of the shuttle 10 on the path V. Such guidance means have the effect of facilitating the movement in translation of the second chassis portion P2 relative to the first chassis portion P1 when the width-adjustment means are actuated. The two cylindrical rods G1 and G2 can also provide attachment means MF1 and MF2 to get attached to the load support of the device.

Here below, referring to FIG. 5 and FIGS. 6A-6D, we present the method for adjusting width according to one particular embodiment of the invention. In this embodiment, the method is implemented by a control unit referenced "CR", comprised in the second chassis portion P2 of the shuttle 10 (as illustrated in FIGS. 2 and 3). The control unit CR is configured firstly to control the movements of the shuttle 10 within the storage depot and, secondly, to manage the above-mentioned width-adjustment means in order to adapt the width between the two gripping arms B1 and B2 to the size of the load to be gripped.

The method is part here of a sequence of motions for withdrawing or removing a load from the storage depot in order to convey it to a system of conveyors that will take charge of conveying it to a picking station. It may be recalled in this respect that the automated package-preparing system comprises a central management system configured to control the entire system: the storage depot, the set of conveyors and the picking stations.

A command for de-stocking a load is transmitted by the central management system to the control unit CR (for example by means of a WIFI type wireless transmission). The removal command comprises a piece of information on the theoretical storage location in the depot of the load to be removed (for example data for localizing the load in the depot). The load to be removed from storage is denoted "C" in FIGS. 6A-6D.

Upon reception of the removal command, the control unit CR initializes the method (step 100). The first locking/unlocking means (suction pads MV1) are then put into the unlocked state and the second locking/unlocking means (suction pads MV2) are put into the locked state.

At the step 200, the control unit CR transmits a move command to the translation means in order to actuate the movement means MD2 for moving the chassis of the shuttle 10. Upon reception of the move command, the translation motor M cooperates with the absolute motion encoder CO to move and position the chassis on the path of travel V as a function of the theoretical storage location of the load C.

When close to the theoretical storage location, the control unit CR activates its obstacle detection system (based on at least one image sensor) in order to detect the contours of the load C and especially the location of the two lateral faces C1 and C2 of the load C that are to come into contact with the arms of the gripping device. These are the two side lateral faces of the load C. In the remaining steps of the method, the control unit CR will put the two gripping arms B1 and B2 of the device into the gripping configuration. This action of putting into configuration is carried out as a function of the location of the lateral faces C1 and C2 respectively determined by the obstacle detection system.

At the step 300, the control unit CR transmits a move command to the translation means so that they position the first chassis portion P1 of the shuttle in such a way that the first gripping arm B1 is situated in a gripping configuration. The term "gripping configuration" is understood to mean the fact that the first gripping arm B1 is situated appreciably in the alignment of the first lateral face C1 of the load, in order to come into contact with it. The shuttle 10 is at a stop.

At the step 400, once the first gripping arm B1, is in the gripping configuration, the control unit CR carries out the gripping configuration of the second gripping arm B2. To this end, the control unit CR sends a locking command for locking the first locking/unlocking means (suction pads MV1) so that they switch into the locked state, and an unlocking command for unlocking the second locking/unlocking means (suction pad MV2) so that they switch into the unlocked state. At this point in time, the first chassis portion P1 is locked relative to the path of travel V (through the suction pads MV1) so that the first chassis portion P1 is held in position and the second chassis portion P2 is unlocked relative to the first chassis portion P1 so that the second chassis portion P2 is made mobile in translation.

At the step 500, the control unit CR transmits a move command to the translation means in order to actuate the movement means MD2 (in other words the control unit CR actuates the movement means by actuating the translation means) as a function of the location of the face C2 of the load C to be gripped. Since the second chassis portion P2 is made mobile independently of the first chassis portion P1 which for its part is fixed, the control unit CR will be able to position the second gripping arm B2 mounted on the second chassis portion P2 so as to adjust the width between the two arms of the device as a function of the real size of the load C (i.e. the distance between the two faces C1 and C2). To this end, the translation means position the second chassis portion P2 along the path of travel V so that the second gripping arm B2 is in a gripping configuration. The term "gripping configuration" refers to the fact that the second gripping arm B2 is placed appreciably in the alignment of the second lateral face C2 of the load in order to come into contact with it.

The width between the two gripping arms B1 and B2 is now adapted to the load C. The control unit CR will now grasp the charge C.

At a step 600, once the two gripping arms B1 and B2 are in the gripping configuration, the control unit CR will send an unlocking command to the first locking/unlocking means (suction pads MV1) so that they switch into the unlocked state and a locking command for locking the second locking/unlocking means (suction pads MV2) so that they switch into the locked state. At this time, the first chassis portion P1 is unlocked relative to path of travel V and the second chassis portion P2 is locked relative to the first chassis portion P1 so that the two chassis portions P1 and P2 are again mechanically attached to each other.

At the step 700, the control unit CR transmits a gripping command to a driving means (not shown in the figures) for driving the gripping arms B1 and B2 to enable the telescopic gripping arms B1 and B2 to grip and move the load C from its storage location to the load-supporting area S of the shuttle 10, with the adapted width.

Once the load C is placed on the load-supporting area S of the shuttle, the control unit CR sends a move command to the translation means to actuate the movement means MD2 so as to convey the load C along the path of travel V and towards the set of conveyors or the preparing station.

FIG. 7 presents the simplified structure of a control unit 70 implementing the method of adapting according to the invention (for example the particular embodiment described here above with reference to FIGS. 5, 6A-6D). This device comprises a random-access memory 70 (for example a RAM), a processing unit 71, equipped for example with a processor and controlled by a computer program stored in the read-only memory 72 (for example a ROM or a hard-drive disk). At initialization, the code instructions of the computer program are for example loaded into the random-access memory 73 and then executed by the processor of the processing unit 71. The processing unit 71 inputs a command for removing a load 74 from storage, for example a command sent by the central management system of the automated package-preparing system. The processor of the processing unit 71 processes the de-storing command 74 and generates control commands at output for the different elements of the gripping device, according to the instructions of the program 72. In particular, the processing unit 71 outputs:

- a first command 75A intended to manage the translation means (in order to activate/deactivate the chassis movement means);
- a second command 75B intended to manage the first locking/unlocking means (in order to lock/unlock the first chassis portion relative to the path of travel);
- a third command 75C intended to manage the second locking/unlocking means (in order to lock/unlock the second chassis portion relative to the first chassis portion);
- a fourth command 75D intended to manage the means for driving the gripping arms (in order to stretch/retract the gripping arms).

Thus, according to one particular embodiment, the invention relates to a use of a computer program in the control unit 70 of the gripping device comprising program code instructions to implement the above-mentioned adapting method when the program is executed on the processor 71 of the control unit 70.

This FIG. 7 illustrates only one particular way, among several possible ways, of performing the different algorithms described in detail here above with reference to the FIGS. 5, 6A-6D. Indeed, the technique of the invention can be carried out equally well:

- on a reprogrammable computing machine (a PC computer, a DSP processor or a microcontroller) executing a program comprising a sequence of instructions, or
- on a dedicated computation machine (for example a set of logic gates such as an FPGA or an ASIC or any other hardware module).

Should the invention be implanted on a reprogrammable computing machine, the corresponding program (i.e. the sequence of instructions) could be stored in a storage medium that is detachable (such as for example a floppy disk, a CD-ROM or a DVD-ROM) or non-detachable, this storage medium being partially or totally readable by a computer or a processor.

In the same way, a hardware component corresponds to any element of a hardware unit capable of implementing a function or a set of functions according to what is described above for the concerned module. It may be a programmable hardware component or a component with an integrated processor for the execution of software, for example an integrated circuit, a smartcard, a memory card, an electronic card for the execution of firmware, etc.

The invention claimed is:

1. A device for gripping a load, comprising:
    a chassis comprising first and second chassis portions defining a load support area;
    a translation element configured to actuate a moving element for moving the chassis along a path of travel;
    first and second gripping arms mounted respectively on the first and the second chassis portions and configured to move a load from or to said support area; and
    a width adjustment, configured to adapt a width between the first and second gripping arms;
    wherein said width adjustment comprises:
        first locking/unlocking elements for locking/unlocking the first chassis portion relative to the path of travel;
        second locking/unlocking elements for locking/unlocking the second chassis portion relative to the first chassis portion; and
        said translation element,
    so that, for an adapting the width between the first and second gripping arms, the first locking/unlocking elements lock the first chassis portion relative to the path of travel, the second locking/unlocking elements unlock the second chassis portion relative to the first chassis portion, and said translation element actuates the moving element to move the second chassis portion along the path of travel.

2. The device according to claim 1, wherein the first locking/unlocking elements are contained in the first chassis portion and comprise at least one first electromagnetic or electromechanical element cooperating with the path.

3. The device according to claim 1, wherein the second locking/unlocking elements comprise at least one second electromagnetic or electromechanical element cooperating with a link mechanically attached to one amongst the first and second chassis portions.

4. The device according to claim 1, wherein the first and second chassis portions comprise a guide allowing the first chassis portion to be guided slidingly relative to the second chassis portion.

5. The device according to claim 1, wherein said first and second chassis portions are provided respectively with a first pair and a second pair of wheels, which form the moving element and are adapted to moving on the path, the translation elements being configured to actuate the wheels of said second pair only.

6. A method for adapting a width between first and second gripping arms of a gripping device comprising:
    a chassis comprising first and second chassis portions defining a load-supporting area,
    translation elements configured to actuate moving elements for moving the chassis along a path of travel,
    the first and second gripping arms mounted respectively on the first and second chassis portions and configured to move a load from or to said support area,
    wherein the method comprises the following steps:
        locking the first chassis portion relative to the path;
        unlocking the second chassis portion relative to the first chassis portion; and
        actuating said translation elements to actuate said moving elements such that the second chassis portion is moved in translation along the path to adapt the width between the first and second gripping arms.

7. The method according to claim 6, comprising a preliminary step of moving the chassis to position the first chassis portion as a function of a location of a first side of the load, the first chassis portion being unlocked relative to the path and the second chassis portion being locked relative to the first chassis portion, said actuating being carried out as a function of a location of a second side of the load.

8. A computer readable and non-transient storage medium storing a computer program product comprising program code instructions for implementing a method for adapting a width between first and second gripping arms of a gripping device, when said program is executed on a computer, wherein the gripping device comprises:
    a chassis comprising first and second chassis portions defining a load-supporting area,
    translation elements configured to actuate moving elements for moving the chassis along a path of travel, the first and second gripping arms mounted respectively on the first and second chassis portions and configured to move a load from or to said support area,
wherein the method comprises the following steps:
locking the first chassis portion relative to the path;
unlocking the second chassis portion relative to the first chassis portion; and
actuating said translation elements to actuate said moving elements such that the second chassis portion is moved in translation along the path to adapt the width between the first and second gripping arms.

\* \* \* \* \*